United States Patent Office 3,209,024
Patented Sept. 28, 1965

3,209,024
PREPARATION OF NAPHTHALENE-2,6-DICARBOXYLIC ACID
Edward J. McNelis, Wallingford, and Wesley R. Cherry, Prospect Park, Pa., assignors to Sun Oil Company, Philadelphia, Pa., a corporation of New Jersey
No Drawing. Filed Feb. 28, 1963, Ser. No. 261,869
8 Claims. (Cl. 260—515)

This application is a continuation-in-part of our copending application Serial No. 152,924, now abandoned, filed November 16, 1961, which in turn was a continuation-in-part of application Serial No. 73,499, filed December 5, 1960, now abandoned.

This invention relates to procedures useful in the preparation of naphthalene-2,6-dicarboxylic acid from impure mixtures of naphthalene dicarboxylic acids obtained by partial oxidation of mixed dimethylnaphthalenes.

Naphthalene dicarboxylic acid in which the carboxyl groups are located at the 2,6-positions is a highly desirable article of commerce, particularly in that it can be used for making polyester type resins which have outstandingly good properties for certain applications. This dicarboxylic acid can be obtained by liquid phase oxidation of 2,6-dimethylnaphthalene in several ways. One known procedure involves the use of molecular oxygen (e.g. air) at temperatures in the range of 100°–250° C. while utilizing a catalyst system comprising a heavy metal oxidation catalyst and elemental bromine or a bromine compound. This type of oxidation process has been described in Saffer et al., United States Patent No. 2,833,816. By way of example, 2,6-dimethylnaphthalene can be converted to the corresponding diacid by contacting an acetic acid solution of the dimethylnaphthalene containing a cobalt acetate-ommonium bromide co-catalyst with molecular oxygen at a temperature in the range of 110°–135° C.

Another suitable procedure for converting 2-6-dimethylnaphthalene to the corresponding naphthalene-2,6-dicarboxylic acid involves the use of nitrogen dioxide ($NO_2$) in combination with selenium. The procedure involves dissolving the 2,6-dimethylnaphthalene in an inert solvent such as trichlorobenzene, adding a small amount of selenium to the mixture and contacting the mixture in liquid phase with gaseous $NO_2$ at a temperature above 140° C., preferably in the range of 180–225° C. This procedure is capable of producing the 2,6-diacid in a yield generally in excess of 80% of the theoretical.

In commercial practice, a difficulty in producing 2,6-naphthalene dicarboxylic acid by the foregoing oxidation routes lies in finding a suitable source of the 2,6-dimethylnaphthalene isomer. This compound occurs in coal tar and cracked petroleum fractions of appropriate boiling range but only in low proportion, since it is associated with the various other dimethylnaphthalene isomers, monocyclic aromatics and non-aromtaic hydrocarbons. A concentrate of the dimethylnaphthalene isomers can be obtained by solvent extraction of the fraction with an aromatic-selective solvent such as furfural or by azeotropic distillation with diethylene glycol, but the 2,6-isomer is till only a minor constituent of the concentrate.

Mixed dimethylnaphthalenes obtained from cracked petroleum fractions or coal tar can be oxidized in accordance with the methods mentioned above for the 2,6-isomer to yield an impure mixture of the corresponding dicarboxylic acid isomers in which the 2,6-diacid is present typically in a concentration of only about 10%. A suitable means of increasing the yield of the 2,6-diacid is highly desirable.

It is known that the dipotassium or dicesium salt of a pure naphthalene dicarboxylic acid in which the carboxyl groups occur other than at the 2,6-positions can be converted to the 2,6-dicarboxylate by the so-called Henkel reaction. The procedure involves heating the naphthalene dicarboxylate to a temperature in the range of 350–530° C. in the presence of a catalyst which is a salt or oxide of cadmium, zinc or mercury and in a carbon dioxide atmosphere at a gauge pressure of 50–750 p.s.i.g. This causes a shift in position of the carboxylate groups to the 2,6-positions. The rearrangement will occur regardless of whether the two carboxylate groups in the starting material are located on the same ring or on different rings of the naphthalene nucleus. The disalts of alkali metals other than potassium and cesium do not appear to be capable of giving satisfactory yields of the 2,6-dicarboxylate by this procedure.

We have found, however, that if the starting material is an impure mixture of diacids obtained by liquid phase partial oxidation of mixed dimethylnaphthalenes by procedures such as discussed above, the Henkel reaction of the dipotassium or dicesium salts thereof will not proceed in the manner desired. Little if any of the 2,6-product will be produced from the other isomers.

We have now discovered that the mixed diacids obtained by partial oxidation of mixed dimethylnaphthalenes can, by a certain pretreatment, be converted into suitable starting material for effecting the Henkel reaction of their dipotassium or dicesium salts to produce the 2,6-product. The pretreatment involves extracting the impure diacids with certain polar organic solvents. This pretreatment apparently removes impurities which inevitably are formed in the oxidation step and which somehow inhibit the Henkel reaction. While it is not known with certainty just what impurities prevent the Henkel reaction from proceeding in the manner desired with the crude mixed diacids, it is believed that the major impurities responsible therefor are naphthalene aldehyde monoacids which are selectively removed by the solvent in the pretreating step. In any event the dipotassium or dicesium salts of the pretreated material will readily undergo the Henkel reaction and yield substantial amounts of the 2,6-dicarboxylate.

According to the invention, mixed naphthalene dicarboxylic acids obtained by the liquid phase partial oxidation of mixed dimethylnaphthalenes are first extracted with a solvent which can be methanol, ethanol, or mixtures thereof. The extraction selectively removes from the mixed diacids certain impurities including naphthalene aldehyde monoacids. The treated diacids are then converted to their corresponding dipotassium or dicesium salts, as by reaction with potassium hydroxide or carbonate or cesium hydroxide or carbonate respectively. The dipotassium or dicesium salts after being dried are heated in the presence of a catalyst, which can be an oxide or salt of cadmium, zinc or mercury, to a temperature in the range of 350°–530° C., more preferably 450°–500° C., and under a carbon dioxide pressure (gauge) of 50–750 p.s.i.g., whereby the rearrangement previously referred to occurs. The resulting dipotassium or dicesium salt is separated from other reaction products and is then converted to the 2,6-dicarboxylic acid by acidifying an aqueous solution of the dipotassium or dicesium salt with a mineral acid.

The solvent extraction step of the present process can be carried out at widely varying temperatures, for example, between 10° C. and the boiling point of the solvent. The amount of solvent used can vary widely but generally from 5 to 100 volumes of solvent will be used per volume of the impure mixed acids. The solvent may or may not contain minor amounts of water. Some amount of the diacids may be extracted by the solvent along with the impurities, but the amount can be minimized by appropriate regulation of the solvent ratio, extraction temperature and water content of the solvent. Reduction in solvent ratio and extraction temperature and increase in the water content tend to reduce the amount of diacids removed by the solvent. Generally these conditions should be regulated so that the amount of material removed is less than about 20% of the impure charge mixture.

After the solvent extraction step, the purified diacids are converted to their corresponding dipotassium or dicesium salts by means of potassium hydroxide or carbonate or cesium hydroxide or carbonate respectively and the mixture is dried prior to being subjected to the Henkel reaction. Drying conveniently can be done by evaporation at reduced pressures.

In carrying out the Henkel reaction step the dipotassium or dicesium salts are mixed with the catalyst and the mixture is heated to a temperature in the range of 350°–530° C., more preferably 450°–510° C., under an atmosphere of carbon dioxide at a pressure of 50–750 p.s.i.g. and more preferably 100–300 p.s.i.g. The catalyst for the reaction can be any of the oxides or salts of cadmium, zinc or mercury. In the case of salts they can be derivatives or either organic or inorganic acids. The cadmium oxides or salts seem to be more effective than zinc or mercury compounds and are preferred. The following are examples of catalyst that can be used: cadmium sulfate, cadmium fluoride, cadmium chloride, cadmium acetate, cadmium benzoate, cadmium bromate, cadmium oxalate, and the corresponding zinc and mercury analogues. The amount of catalyst employed can vary widely but preferably is in the range of 2 to 10 moles per 100 moles of the dipotassium or dicesium salts. The time that the reaction mixture is maintained within the temperature range of 350–530° C. can vary considerably, for example, from 0.1 to 5.0 hours. However, it is distinctly preferable merely to heat the mixture to the desired temperature level, which preferably is in the range of 450°–510° C., and then allow it to cool immediately. The procedure has been found to minimize undesirable side reactions and result in higher yields of the 2,6-product than when the reaction temperature is maintained for a considerable time.

In addition to the desired 2,6-dicarboxylate product some naphthalene or other by-products are formed in the reaction. These can be removed from the reaction mixture by evaporation at elevated temperature, for example, by venting the system while the reaction mixture is still hot. The by-products can also be removed by extraction from the salts with a suitable solvent, e.g., benzene or ethyl ether. After the dipotassium or dicesium salt has been freed of the volatile or hydrocarbon soluble by-products, it is dissolved in water and filtered to remove any carbonaceous material that may have formed during the reaction. The filtrate is then acidified by means of a mineral acid to convert the salt to naphthalene-2,6-dicarboxylic acid which forms as a precipitate and can be recovered by filtration. Generally minor amounts of other naphthalene dicarboxylic acids resulting from incomplete rearrangement in the Henkel reaction will be present in the 2,6-product. These other acids can be selectively removed from the desired product by washing it with methanol, since the 2,6-diacid has distinctly lower solubility in alcohol than the other isomers. When a high purity 2,6-product is desired, it may be desirable to carry out such washing step at elevated temperature to insure effective removal of the other isomers.

The following example is a specific illustration of the present process:

A concentrate of dimethylnaphthalenes, which had been obtained by azeotropic distillation of a catalytically cracked gas oil fraction with diethylene glycol, was used to prepare a crude mixture of naphthalene dicarboxylic acids by partial oxidation. The concentrate contained about 94% of dimethylnaphthalenes having approximately the following composition as determined by vapor phase chromatography:

| | Percent |
|---|---|
| 2,6-isomer | 18.2 |
| 2,7-isomer | 12.4 |
| 1-ethyl isomer | 1.3 |
| 1,6-isomer | 22.1 |
| 1,7-isomer | 9.1 |
| 1,3-isomer | 25.2 |
| 2,3-isomer | 4.1 |
| 1,4-isomer | 1.6 |
| 1,5-isomer | 1.9 |
| 1,2-isomer | 0.7 |
| 2-ethyl isomer | 3.2 |

This material was converted to a mixture of the crude diacids by contacting a 15 weight percent solution of the mixture in dichloro benzene in the presence of a 5 weight percent selenium and excess nitrogen dioxide at a temperature of about 150° C. for a time of three hours.

A sample of the impure diacids was converted to their dipotassium salts which were then subjected to the Henkel reaction by heating at 410° C. for two hours in the presence of 10 mole percent of cadmium chloride and under a $CO_2$ pressure of 750 p.s.i.g. No increase in the 2,6-dipotassium salt was obtained.

Another sample of the impure diacids (51.956 gms.) was extracted with 1000 ml. of methanol and subsequently converted to the dipotassium salts by the use of potassium hydroxide. The extract obtained amounted to 9.556 gms. The dipotassium salts (2.94 gms.) were then subjected to the Henkel reaction under the same conditions as used with the first sample mentioned above. The reaction mixture was extracted with ethyl ether to remove naphthalene and any other ether-soluble by-products. The salts, which were insoluble in the ether, were then dissolved in water and the mixture was filtered to remove carbonaceous material. The aqueous solution of salts was acidified with hydrochloric acid to precipitate the acid product which was then purified by washing with methanol. The yield of the 2,6-diacid was 2.5 times the amount of 2,6-diacid contained in the original impure mixture. A higher yield of the 2,6-diacid can be obtained by using a lower $CO_2$ pressure (e.g., 300 p.s.i.g.) and merely heating the reaction mixture to the desired temperature level and allowing it to cool immediately.

The foregoing examples illustrate the improvement according to this invention with regard to the use of methanol as the solvent for converting the crude mixed acids into suitable charge material for the Henkel reaction. Substantially equivalent results are obtained when ethanol or mixtures of methanol and ethanol are used as the extraction solvent, and the dicesium salts are substituted for the dipotassium salts.

We claim:
1. In the preparation of naphthalene-2,6-dicarboxylic acid from an impure mixture of naphthalene dicarboxylic acids prepared by liquid phase partial oxidation of a mixture of dimethylnaphthalenes said dimethylnaphthalenes being secured from the group consisting of cracked petroleum fractions and coal tar, the steps of
(a) extracting said mixture of dicarboxylic acids with a solvent selected from the group consisting of methanol, ethanol, and mixtures thereof,
(b) converting the resulting purified dicarboxylic acids to salts selected from the group consisting of dicesium salts and dipotassium salts by reaction with an alkali metal compound selected from the group consisting of potassium hydroxide, cesium hydroxide, potassium carbonate and cesium carbonate,
(c) heating said salts in the presence of a catalyst selected from the group consisting of oxides and salts of cadmium, zinc and mercury to a temperature in the range of 350°–530° C. and under a carbon dioxide pressure of 50–750 p.s.i.g.,

(d) separating the resulting salt from other reaction products, and (e) recovering naphthalene-2,6-dicarboxylic acid therefrom.

2. Method according to claim 1 wherein said temperature is in the range of 450°–510° C.

3. Method according to claim 1 wherein said catalyst is a cadmium halide.

4. Method according to claim 1 wherein said extraction is carried out at a temperature between 10° C. and the boiling point of the solvent and the volume proportion of solvent to said mixture of naphthalene dicarboxylic acids is in the range of 5:1 to 100:1.

5. Method according to claim 1 wherein the solvent is methanol.

6. In the preparation of naphthalene-2,6-dicarboxylic acid from an impure mixture of naphthalene dicarboxylic acids prepared by liquid phase partial oxidation of a mixture of dimethylnaphthalenes said dimethylnaphthalenes being secured from the group consisting of cracked petroleum fractions and coal tar, the steps of (a) extracting said mixture of dicarboxylic acids with a solvent selected from the group consisting of methanol, ethanol, and mixtures thereof, (b) converting the resulting purified dicarboxylic acids to dipotassium salts by reaction with a potassium compound selected from the group consisting of potassium hydroxide and potassium carbonate.

(c) heating the dipotassium salts in the presence of a catalyst selected from the group consisting of oxides and salts of cadmium, zinc and mercury to a temperature in the range of 350°–530° C. and under a carbon dioxide pressure of 50–750 p.s.i.g., (d) separating the resulting salts from other reaction products, and (e) recovering naphthalene-2,6-dicarboxylic acid therefrom.

7. Method according to claim 6 wherein said extraction is carried out at a temperature between 10° C. and the boiling point of the solvent and the volume proportion of solvent to said mixture of naphthalene dicarboxylic acids is in the range of 5:1 to 100:1.

8. Method according to claim 7 wherein the solvent is methanol, said dipotassium salts are heated to a temperature in the range of 450°–510° C. and said catalyst is a cadmium halide.

References Cited by the Examiner

UNITED STATES PATENTS

| | | | |
|---|---|---|---|
| 2,741,633 | 4/56 | McKinnis et al. | 260—525 |
| 2,833,816 | 5/58 | Saffer et al. | 260—524 |
| 2,840,604 | 6/58 | Feighner et al. | 260—525 |
| 2,849,482 | 8/58 | Raecke et al. | 260—515 |
| 2,966,513 | 12/60 | Fields | 260—524 X |
| 3,101,368 | 8/63 | Schenk | 260—515 |

FOREIGN PATENTS

| | | |
|---|---|---|
| 623,836 | 5/49 | Great Britain. |
| 825,375 | 12/59 | Great Britain. |

LORRAINE A. WEINBERGER, *Primary Examiner.*

LEON ZITVER, *Examiner.*